US008713451B2

(12) United States Patent
Kunz et al.

(10) Patent No.: US 8,713,451 B2
(45) Date of Patent: Apr. 29, 2014

(54) LATE LOADING RICH MEDIA

(75) Inventors: Michael C. Kunz, Seattle, WA (US); David S. Barlin, Seattle, WA (US); Joost Bon, Seattle, WA (US); Brian D. Holdsworth, Woodinville, WA (US); Michael D. Schackwitz, Pleasanton, CA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 12/428,596

(22) Filed: Apr. 23, 2009

(65) Prior Publication Data

US 2010/0275131 A1 Oct. 28, 2010

(51) Int. Cl.
*G06F 3/00* (2006.01)

(52) U.S. Cl.
USPC .......................................... 715/752

(58) Field of Classification Search
None
See application file for complete search history.

(56) References Cited

U.S. PATENT DOCUMENTS

| | | | |
|---|---|---|---|
| 6,650,890 B1 | 11/2003 | Irlam et al. | |
| 6,907,418 B2 | 6/2005 | Shin et al. | |
| 7,113,948 B2 | 9/2006 | Jhingan et al. | |
| 7,257,639 B1 | 8/2007 | Li et al. | |
| 7,865,394 B1* | 1/2011 | Calloway et al. | 705/14.4 |
| 2002/0078158 A1 | 6/2002 | Brown et al. | |
| 2002/0129089 A1* | 9/2002 | Hegde et al. | 709/200 |
| 2002/0196935 A1 | 12/2002 | Wenocur et al. | |
| 2003/0200145 A1 | 10/2003 | Krassner et al. | |
| 2003/0236836 A1 | 12/2003 | Borthwick | |
| 2003/0237091 A1* | 12/2003 | Toyama et al. | 725/40 |
| 2005/0050150 A1* | 3/2005 | Dinkin | 709/207 |
| 2005/0222903 A1 | 10/2005 | Buchheit et al. | |
| 2006/0149677 A1 | 7/2006 | Shahine et al. | |
| 2007/0088687 A1 | 4/2007 | Bromm et al. | |
| 2007/0179832 A1 | 8/2007 | Reich | |
| 2007/0271527 A1* | 11/2007 | Paas et al. | 715/810 |
| 2008/0004056 A1 | 1/2008 | Suzman | |
| 2008/0010277 A1* | 1/2008 | Caruso et al. | 707/5 |
| 2008/0120344 A1* | 5/2008 | Armstrong et al. | 707/104.1 |
| 2008/0126515 A1* | 5/2008 | Chambers et al. | 709/218 |
| 2008/0133703 A1* | 6/2008 | Myllynen et al. | 709/217 |
| 2008/0177713 A1* | 7/2008 | Armstrong et al. | 707/3 |

(Continued)

FOREIGN PATENT DOCUMENTS

WO 2008062445 A2 5/2008

OTHER PUBLICATIONS

Wikipedia, "Whitelist," Oct. 30, 2007, http://web.archive.org/web/20071030185433/http://en.wikipedia.org/wiki/Whitelist.*

(Continued)

*Primary Examiner* — Matt Kim
*Assistant Examiner* — Maryam Ipakchi
(74) *Attorney, Agent, or Firm* — Bryan Webster; Brian Haslam; Micky Minhas

(57) ABSTRACT

Methods for delivering rich media content to a user within an email system via a dedicated media channel. An email system receives an email message associated with rich media content from a registered sender for delivery to a recipient. To improve the recipient's viewing experience, the email system ensures that the rich media content is loaded in a rich media database before delivering the email message to the recipient. When the recipient reads the email message, the email system delivers the rich media content to the recipient from the rich media database via a dedicated media channel efficiently and at a low cost.

7 Claims, 7 Drawing Sheets

(56) References Cited

U.S. PATENT DOCUMENTS

| | | | |
|---|---|---|---|
| 2008/0183584 A1* | 7/2008 | Armstrong et al. | 705/14 |
| 2008/0183760 A1* | 7/2008 | Spring et al. | 707/104.1 |
| 2008/0228581 A1* | 9/2008 | Yonezaki et al. | 705/14 |
| 2009/0024554 A1 | 1/2009 | Murdock et al. | |
| 2010/0017294 A1 | 1/2010 | Mancarella et al. | |
| 2010/0274628 A1* | 10/2010 | Kunz et al. | 705/10 |
| 2011/0035458 A1 | 2/2011 | Burnim | |
| 2011/0060803 A1* | 3/2011 | Barlin et al. | 709/206 |

OTHER PUBLICATIONS

Oliver, "Spam Filter Blacklists and Whitelists," Sep. 11, 2008, http://www.allspammedup.com/anti-spam/spam-filter-blacklists-and-whitelists/.*

Wikipedia, "Tag (metadata)," Aug. 13, 2008, http://web.archive.org/web/20080813092529/http://en.wikipedia.org/wiki/Tag_%28metadata%029.*

Santilli, "Metadata as a 'filing system,'" Apr. 27, 2006, http://lifehacker.com/169971/metadata-as-a-filing-system.*

Yorgen Edholm, Email Attachments: The Scourge of the Network, Lotus.solutions-daily.com, Jul. 21, 2008.

"Emailbrain," emailbrain-Smart Email and SMS Communication [online], [retrieved on Mar. 3, 2009], Retrieved from the Internet: <URL:http://www.emailbrain.com/eb/features.shtml#sendAnchor>, 4 pages.

Jack Loechner, "eMail Tops Online Ad Budget Change in '09," MediaPostBLOGS [online], Feb. 17, 2009, Retrieved from the Internet: <URL:http://www.mediapost.com/publications/?fa=Articles.showArticle&art_aid=100360>, 2 pages.

Family Marketing, CPA Lead Generation-Display Advertising-Email & Newsletter Sponsorship [online], [retrieved on Mar. 3, 2009], Retrieved from the Internet: <URL:http://www.familymarketing.com/services/>, 1 page.

Michael Gorman, "The Next Major Email Domain: Gmail.com", Digital Impact [online], Jun. 2004, Retrieved from the Internet: <URL:http://www.digitalimpact.com/pdfs/Gmail.com_06.17.04.pdf>, 6 pages.

"What are email message headers?," [online] copyright Jun. 2002, [retrieved on Mar. 29, 2011], Retrieved from the Internet: <URL:http://www.mailsbroadcast.com/email.broadcast.faq/3.faq.email.broadcast.htm>, 3 pages.

Office Action dated Apr. 6, 2011, U.S. Appl. No. 12/428,620, filed Apr. 23, 2009, 26 pages.

Response to Office Action dated Sep. 6, 2011, U.S. Appl. No. 12/428,620, filed Apr. 23, 2009, 14 pages.

Final Office Action dated Nov. 9, 2011, U.S. Appl. No. 12/428,620, filed Apr. 23, 2009, 21 pages.

Response to Final Office Action dated Feb. 9, 2012, U.S. Appl. No. 12/428,620, filed Apr. 23, 2009, 13 pages.

U.S. Appl. No. 12/428,620, filed Apr. 23, 2009.

* cited by examiner

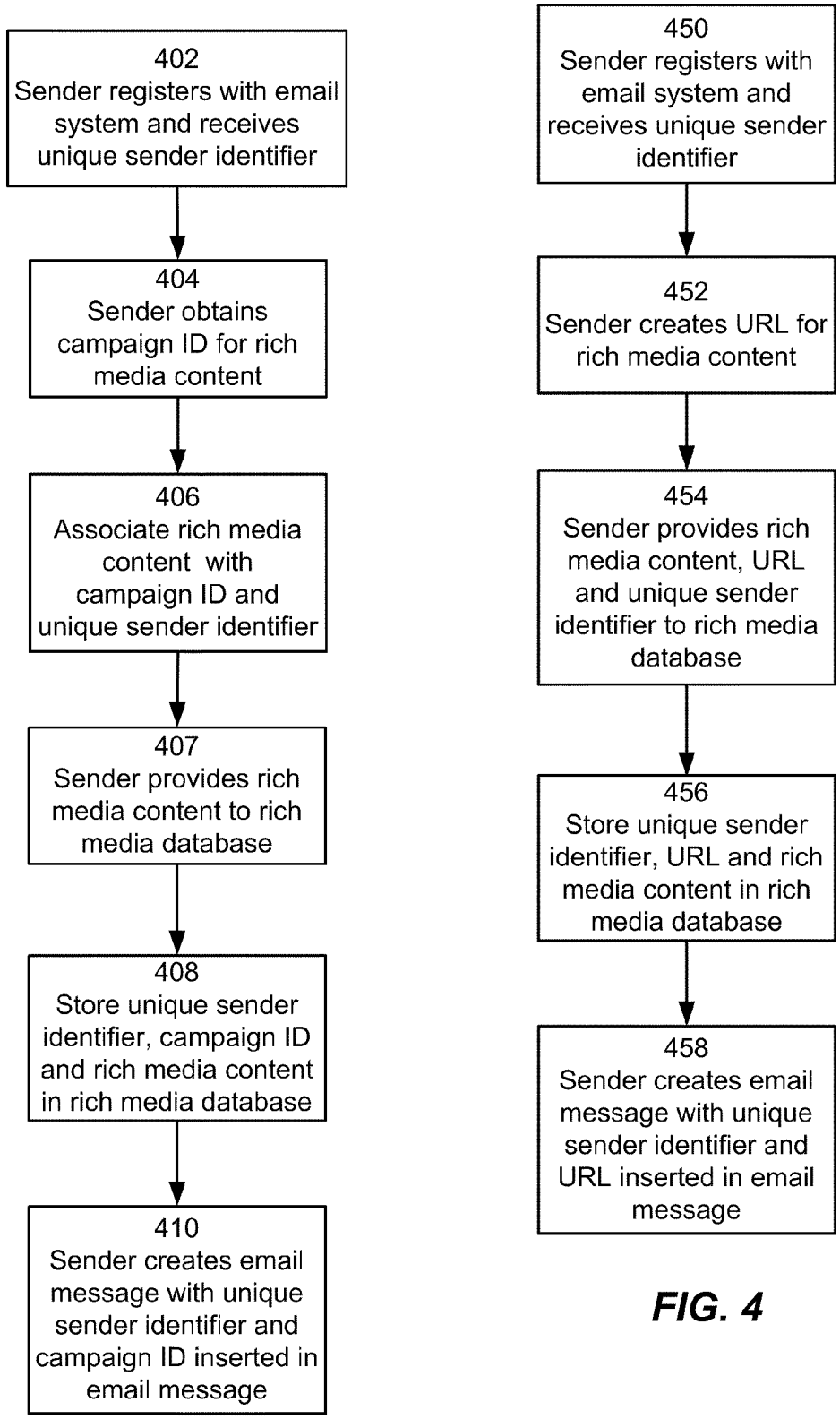

FIG. 8

Windows Media Player

THE FOLLOWING PREVIEW HAS BEEN APPROVED FOR

ALL AUDIENCES

BY THE MOTION PICTURE ASSOCIATION OF AMERICA, INC.

250

280

226 — Drafts
228 — Junk (2)
230 — Sent
232 — Deleted (3)
       20
       6

From: Paramount Pictures
(movies@paramount.com)
To: janedoe@hotmail.com
Subject: trailer Junk ☒ Move to 222  204

240

202

LATE LOADING RICH MEDIA

BACKGROUND

Electronic mail (email) marketing is a form of direct marketing which uses email messages as a means of communicating commercial or fundraising messages to one or more recipients. Marketing via email represents a significant opportunity to marketers due to its broad reach and measured efficacy. A major deficiency of email, however, is that the most commonly used email systems have limited abilities to support the generation and transmission of email messages that deliver rich media content into the viewing page of an email message.

Many email systems include security settings because of the proliferation of spam and email viruses. These security settings often prevent users from viewing video, audio and FLASH animations embedded in a received email message. One consequence of these security settings is that email marketing has suffered from an inability to send email messages to users without much more than basic text. Senders often add a "click to view" option at the top of the email message, which upon the recipient selecting the option, allows the media content to be displayed in the email message. This limitation means that a recipient, viewing an email message from a marketer, often views a message with missing content or blank spaces, which diminishes the marketing impact sought by the sender.

SUMMARY

One aspect of the present technology is a method for efficiently loading rich media content and delivering the content to a recipient via a dedicated media channel upon the recipient opening the email message. An email system, upon receiving an email message from a sender, verifies that the sender is registered with the email system and ensures that the rich media content is loaded in a rich media database. Upon the recipient opening the email message, the email system delivers the rich media content to the recipient from a rich media database via a dedicated media channel. In an embodiment, the email message is rendered with the rich media content displayed in the body portion of the email message. Alternatively, the rich media content is displayed in a separate window from the email message.

To improve the recipient's viewing experience, the email system ensures that the rich media content associated with an email message is pre-loaded into a rich media database. In one embodiment, the sender pushes the rich media content to the rich media database controlled by the email system prior to sending the email message to the email system. Alternatively, the email system may pull the rich media content into the rich media database from the sender's advertising server based in part in a URL provided by the sender.

One aspect of the present technology is to provide an authoring environment that senders can use to register with the email system. The environment also allows senders to create an email message that will trigger the email system to deliver the rich media content associated with the email message to the recipient. Each sender obtains a unique sender identifier upon registering with the email system. The email system recognizes an email message containing a unique sender identifier as being sent by a registered sender. The authoring environment further allows a sender to create an email message with a campaign ID, which is an ID that uniquely correlates with a particular piece of rich media content. The authoring environment alternatively allows a sender to create an email message with a URL. The email system will deliver the rich media content based on either the campaign ID or URL contained in the email message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 depicts a flow diagram of a sender registering with the content delivery system and creating an email message.

FIG. 4 depicts another flow diagram of a sender registering with the content delivery system and creating an email message.

FIG. 8 depicts another embodiment of a user interface for displaying rich media content associated with an email message.

DETAILED DESCRIPTION

The technology described herein delivers rich media content associated with an email message to a recipient via a dedicated rich media channel. Senders register with the email system and receive a unique sender identifier. After registering, a sender creates an email message that will trigger the email system to deliver rich media content associated with the email message to a recipient. The email system delivers the rich media content to the recipient via a dedicated media channel at a low cost.

Figure 1:
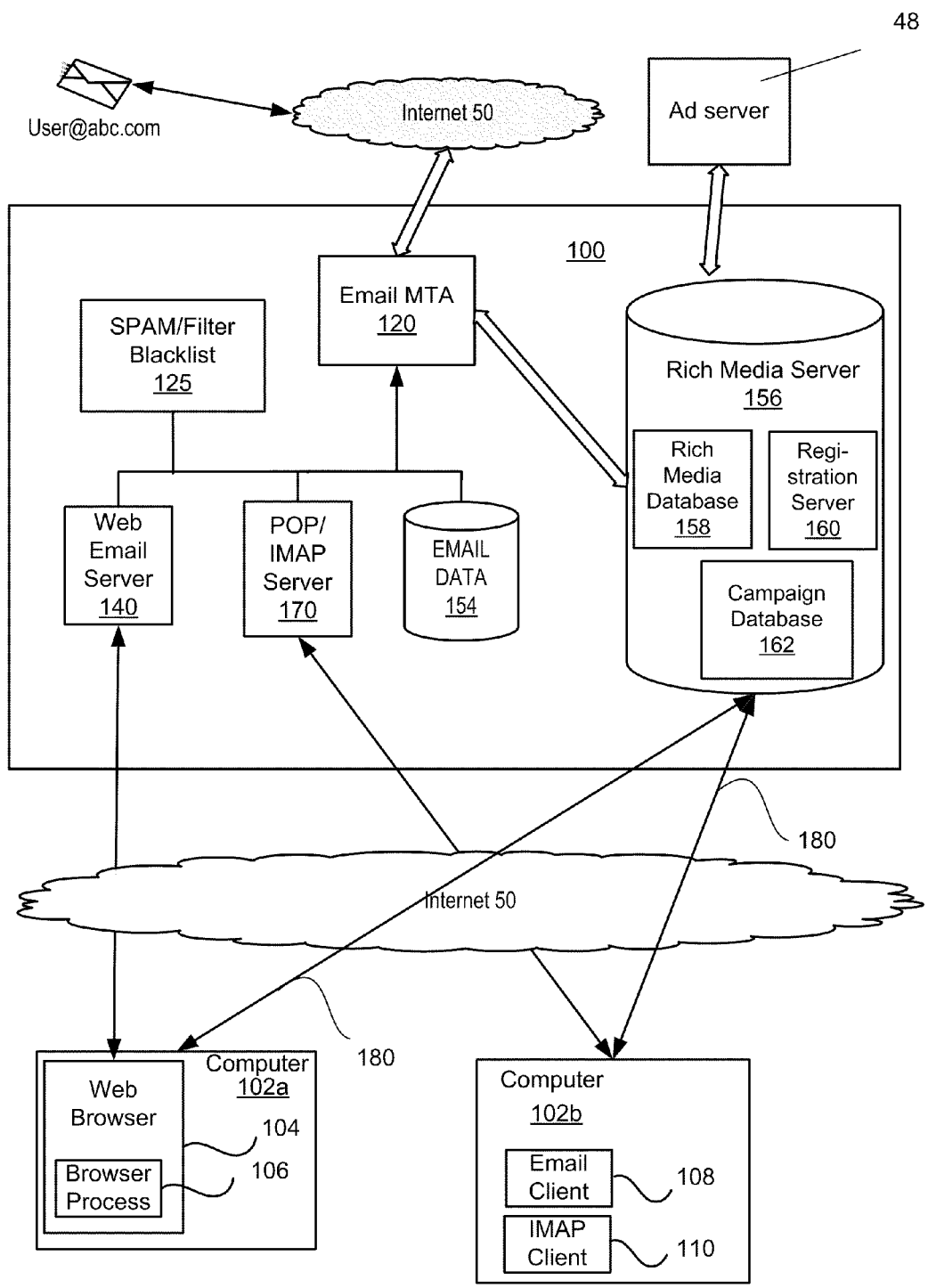
FIG. 1 depicts an exemplary content delivery system suitable for implementing the technology discussed herein.

The technology disclosed herein will now be described in reference to FIG. 1-8. FIG. 1 illustrates an email system 100 which may be provided by a system administrator. The email system 100 includes an email message transfer agent (MTA) 120 which accepts and forwards email messages provided from a LAN, WAN, or Internet 50 from and to an email data store 154. As will be described in more detail later, rich media content is stored in the email system in a rich media database 158 and is delivered to a user's computer (e.g., 102a, 102b) via a dedicated media channel 180. Users access email messages stored in an email data store 154 maintained by the system 100 via a number of interfaces.

System 100 may include a web-based email server 140 which provides a browser based user interface access to email data store 154 to client's operating computer 102a utilizing a web browser and a browser process 106. A POP/IMAP or other email synchronization protocol server 170 may provide email access to users operating a computer 102b having, for example, a dedicated email client 108 or a POP/IMAP client 110. Mail system 100 may also include a spam filter, white/black list server or process 125 which checks inbound messages for characteristics identifying the email as legitimate or spam. There are a number of methods that an email administrator (e.g., of email system 100) can use to reduce the load of spam on their systems and mailboxes. Some of these methods depend upon rejecting email from Internet domains known or likely to send spam. Other methods rely on automatically analyzing the content of email messages and weeding out those which resemble spam.

FIG. 1 illustrates that the rich media server 156 includes a rich media database 158, registration server 160 and a campaign database 162. The rich media database 158 stores rich media content provided by a sender. Each item of content is associated with a unique sender identifier and either a URL or campaign ID. The registration server 160 provides a registration interface for senders seeking to register with the email system 100. The registration server 160 also issues unique sender identifiers and campaign IDs and stores information provided by a sender during registration with the email system 100. The campaign database 162 stores campaign IDs issued by the email system 100 upon a sender depositing rich media content in the rich media database 158. FIG. 1 illustrates that the rich media database 158, registration server 160 and campaign database 162 is a stand-alone component of the rich media server 156. It is within the scope of the technology for these components to be combined in the rich media server 156. As will be discussed in more detail later, rich media content stored in the rich media database 158 is delivered to a recipient via a dedicated media channel 180. The term "rich media" is defined as any combination of images, video, audio, formatting, animation, HTML, programmatic scripting, and other functionality that can be delivered through a web browser application.

In one embodiment, email MTA 120, Spam Filter/white/Blacklist 125, rich media server 156, web email server 140, and POP/IMAP or other email synchronization protocol server 170 are separate and distinct servers. However it should be recognized that any one of these particular servers/databases provides services which may be combined on any combination of servers or a single server, and the particular hardware implementation of the email system 100 described in FIG. 1 is merely exemplary of the services provided by the email system 100.

As will be discussed in more detail later, the email system 100 renders an email message received from a sender with associated rich media content retrieved from the rich media server 156. In order for the email system 100 to retrieve rich media content from the rich media server 156, a sender first registers with the email system 100 and pushes the rich media content into the rich media database 158. Alternatively, FIG. 1 illustrates that the email system 100 may pull the rich media content from a sender's ad server 48 into the rich media database 158. An ad server may comprise a server operated by the sender outside of the email system 100 which stores advertisements. An ad server 48 may be a local server maintained by a single sender or a remote third-party server that serves ads across domains owned by multiple senders.

Figure 2:
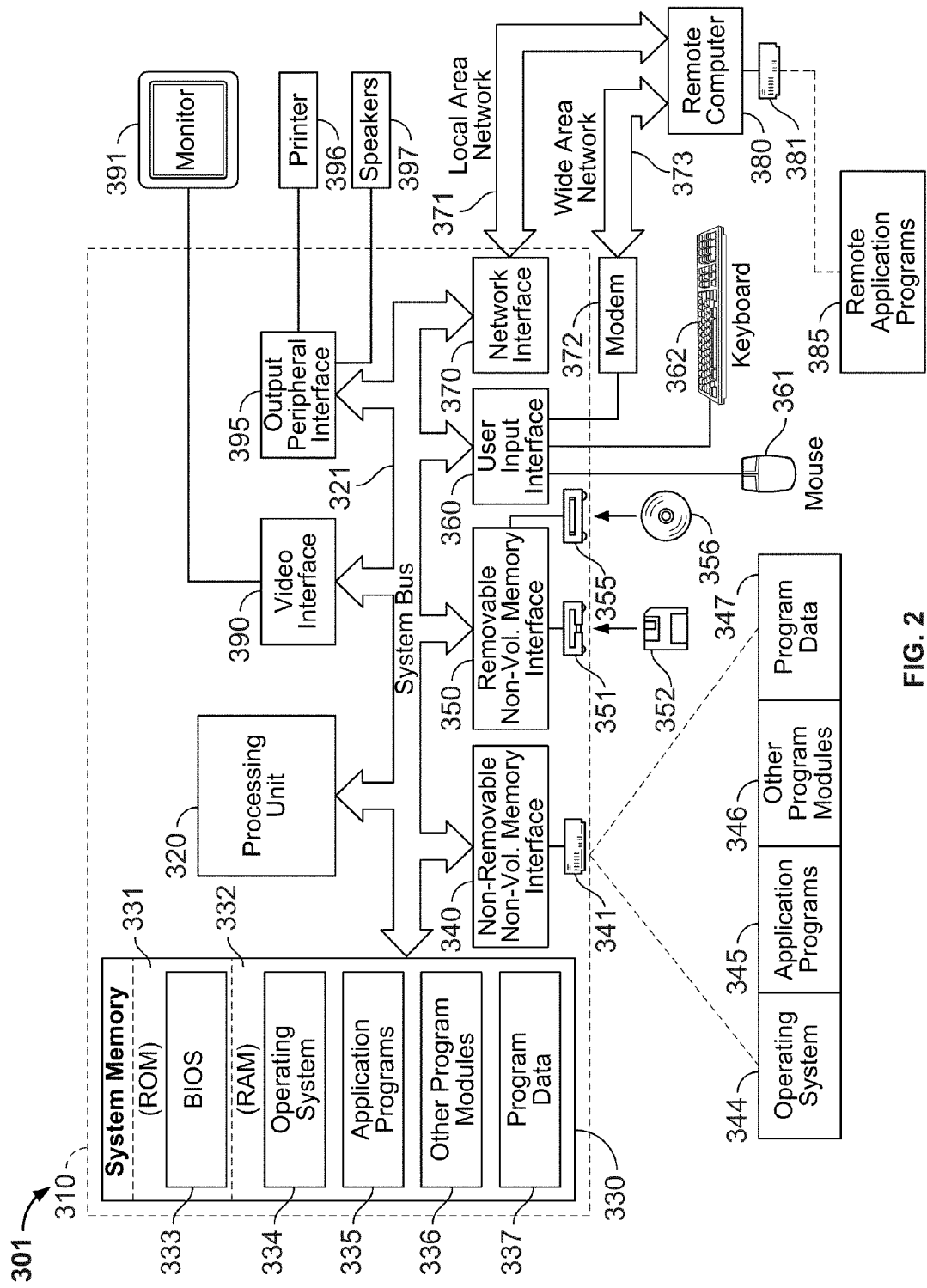
FIG. 2 depicts a processing system suitable for use in the systems described with respect to FIG. 1.

Any of the components of the email system 100 (e.g., web email server 140, rich media server 156, POP/IMAP Server 170, etc.) may be a processing device such as that described with respect to FIG. 2. With reference to FIG. 2, an exemplary system for implementing the technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures.

By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 231. RAM 332 typically contains data and/or program modules that are immediately accessible to and/or presently being operated on by processing unit 320. By way of example, and not limitation, FIG. 2 illustrates operating system 334, application programs 335, other program modules 336, and program data 337.

The computer 310 may also include other removable/non-removable, volatile/nonvolatile computer storage media. By way of example only, FIG. 2 illustrates a hard disk drive 340 that reads from or writes to non-removable, nonvolatile magnetic media, a magnetic disk drive 351 that reads from or writes to a removable, nonvolatile magnetic disk 152, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 2, provide storage of computer readable instructions, data structures, program modules and other data for the computer 310. In FIG. 2, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 320 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 2. The logical connections depicted in FIG. 2 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 2 illustrates remote application programs 385 as residing on memory device 381. It will be appreciated that the network connections shown are exemplary and other means of establishing a communications link between the computers may be used.

The email system 100 discriminates between a registered sender and a sender that has not registered with the email system 100. As will be described later herein, the email system 100 renders an email message with rich media content only if the email message is associated with a registered sender. FIGS. 3-4 are flow diagrams illustrating exemplary steps of how a sender may register with the email system 100 and compose an email message such that the email system 100 will render the email message with the associated rich media content. As will be discussed later in more detail, the rich media content stored in the rich media server 156 is retrieved by the email system 100 via a URL or campaign ID contained in the email message.

A sender that would like the email system 100 to deliver rich media content to a recipient of an email message registers with the email system 100. There are several methods whereby a sender may create an email message that will cause the email system 100 to deliver rich media content to a recipient upon the recipient opening the email message. FIG. 3 illustrates one embodiment for registering with the email system 100 and composing an email message. At step 402, the sender registers with the email system 100. Registration may be accomplished by accessing a registration interface provided by the registration server 160, which collects information from the sender and authenticates the sender information. By way of example only, the information provided by a sender during the registration process includes a list of domains and Internet Protocol (IP) addresses that the email system 100 may recognize as being associated with the sender. Other information that may be provided to the email system 100 for registration includes, but is not limited to, sender address, names, payment information, specific codes associated with paid relationships (account numbers, tracking codes) reseller IDs or other unique identifiers. In response to registering with the email system, the registration server 160 provides the sender with a unique sender identifier. Each unique sender identifier issued by the registration server 160 and, by way of example only, may comprise a 64 bit ID. A sender is only required to register with the email system 100 once. In some embodiments, a sender may register through a direct sales channel or relationship with a provider of the service disclosed herein. In other embodiments, a sender may register via an indirect sales channel or relationship with a third-party agent.

Once registered with the email system 100, the sender has several options to store rich media content in the rich media database 158. At step 404, for each unique campaign or media email message the sender wishes to transmit, the sender obtains a campaign ID from the campaign database 162. A campaign ID is a unique identifier that the email system 100 recognizes as correlating with a single piece of rich media content. By way of example only, a campaign ID may comprise a 64 bit ID.

At step 406, the campaign ID is associated with a piece of rich media content. In the FIG. 3 embodiment, the sender adds one or more tags to the rich media content file consisting of the campaign ID and unique sender identifier. At step 407, the sender provides the tagged rich media content file to the rich media server 156.

At step 408, the rich media server 156 stores the unique sender identifier, campaign ID, and rich media content. Using the information contained in the rich media server 156, the email system 100 can now recognize that an email message containing the campaign ID has been sent from a registered sender, and upon the recipient opening the email message, render the email message with the rich media content associated with the campaign ID. As will be discussed in more detail later, the email system 100 recognizes the sender of the email message as a registered sender based on the unique sender identifier contained in the email message.

At step 410, the sender creates an email message intended for delivery to one or more recipients that will trigger the email system 100 to deliver the rich media content to the recipient(s) from the rich media server 156. An email message contains a header portion and a body portion. In order for the email system 100 to recognize that rich media content should be delivered when a recipient opens the email message, the sender associates the unique sender identifier and campaign ID with the email message. The campaign ID and unique sender identifier may be inserted into any field in the header portion or body portion of the email message.

FIG. 4 illustrates that a sender is not required to obtain a campaign ID in order for the email system 100 to recognize that rich media content should be delivered when a recipient opens an email message. At step 450, the sender registers with the email system 100 and receives a unique sender identifier.

At step 452, the sender creates a Uniform Resource Locator (URL) describing the location of the rich media content in the sender's advertising server 48 that the sender would like the email system 100 to deliver when a recipient opens the email message from the sender. One of ordinary skill in the art recognizes that a URL specifies where an identified resource is available. At step 454, the sender provides the rich media content, URL, and unique sender identifier to the rich media server 156. At step 456, the rich media server 156 stores the URL and sender ID. Using the information contained in the rich media server 156, the email system 100 will recognize that an email message containing the unique sender identifier has been sent from a registered sender, and upon the recipient opening the email message, will render the email message with the rich media content (based on the URL).

At step 458, the sender creates an email message intended for delivery to one or more recipients that will trigger the email system 100 to deliver the rich media content to the recipient's computer (e.g., 102a, 102b). In this instance, the email message from the sender does not contain a campaign ID. Thus, in order for the email system 100 to recognize that rich media content should be delivered upon the recipient opening the email message, the sender associates the unique sender identifier and URL with the email message prior to sending the email message to the email system 100. The URL and unique sender identifier may be inserted into any field in the header portion or body portion of the email message.

At this point, the sender has created an email message intended for delivery to a recipient (via the email system 100). The email message has been created by the sender is such a way that the email system 100 will recognize that the sender has registered with the email system 100. The email message has also been created so that the email system 100 is able locate the rich media content the sender wishes to have displayed to the recipient.

Figure 5:
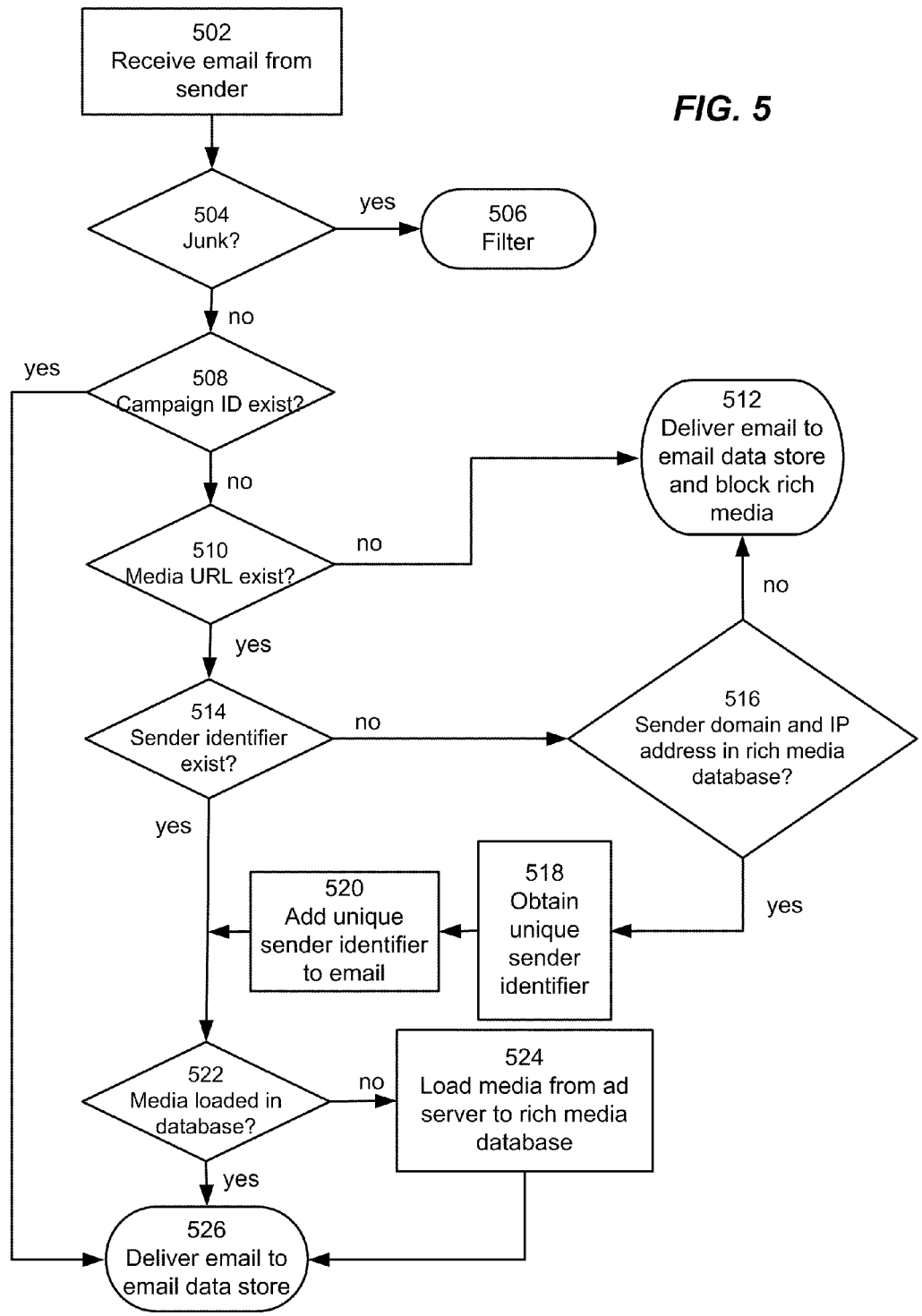
FIG. 5 depicts a flow diagram displaying exemplary steps for ensuring that rich media content is loaded in a rich media database.

To improve the recipient's experience in viewing the rich media content associated with the email message, the email system 100 ensures that the rich media content is loaded in the rich media database 158 prior to delivering the sender's email message to the email data store 154. This way, the email message may be rendered with the rich media content upon the recipient opening the email message. FIG. 5 illustrates exemplary steps that the email system 100 takes to ensure that rich media content associated with an email message is loaded and stored in the rich media database 158 before the email message is delivered to the email data store 154.

At step 502, the technology receives an email message from a sender. Using the email system 100 shown in FIG. 1, the email MTA 120 receives the email message from the sender via a network 50 using any of a variety of email protocols such as, but not limited to, Simple Mail Transfer Protocol (SMTP).

At step 504, the technology determines if the email message is legitimate or junk via the Spam Filter-White/Blacklist 125. A spam filter is a program that is used to detect unsolicited and unwanted messages and prevents those messages from getting to a user's inbox. A spam filter looks for certain criteria on which it bases judgments on whether a message is spam or not. If the technology determines that the email message comprises junk (or spam), or the sender is listed in the user's blacklist, action is taken on the message in accordance with the defined spam/blacklist policies of the system administrator and/or user, at step 506.

If the technology, at step 504, determines that the email message is legitimate (e.g., not junk, spam or blacklisted), the technology proceeds to step 508. At step 508, the technology determines if the email message contains a campaign ID. If the email message contains a campaign ID, the technology recognizes that rich media content associated with the email messages has been loaded in the rich media database 158. The technology also recognizes that the email message is associated with a registered sender because only a registered sender can obtain a campaign ID. Thus, the technology proceeds to deliver the email message to the email data store 154, at step 526.

If the email message does not contain a campaign ID, at step 508, the technology determines if the email message contains a URL, at step 510. If the email message does not contain a URL, the email system 100 is not able to determine if there is any rich media content associated with the email message. Thus, the technology delivers the email message to the email data store 154, at step 512. Any rich media content embedded in the email message will be blocked when the recipient opens the email message. If the email message contains a URL, the technology determines if the email message contains a unique sender identifier, at step 514, before concluding that the email message is associated with a sender that has not registered with the email system 100 (in which case the email system 100 would ignore the URL).

If the email message does not contain a unique sender identifier, the technology determines if the sender domain and Internet Protocol (IP) address contained in the email message is stored in registration server 160 of the rich media server 156, at step 516. If the sender domain and IP address associated with the email message is not stored in the rich media server 156, the technology fails to recognize the sender of the email message as a registered sender and proceeds to step 512. At step 512, the technology delivers the email message to the email data store 154, but will block the display of any content associated with the URL.

If the technology locates the sender domain and IP address associated with the email message at step 516, the technology obtains a sender ID associated with the sender domain and IP address from the registration server 160, at step 518. At step 520, the technology adds the unique sender identifier into the email message. In one embodiment, the technology adds the unique sender identifier in a field in the header portion of the email message. Alternatively, the technology adds the unique sender identifier in a field in the body portion of the email message.

The technology now recognizes that the sender has registered with the email system 100 and the email message is not junk email (or spam). However, the email message does not contain a campaign ID, which would indicate that rich media content has been loaded into the rich media database 158. Thus, the technology next determines if the rich media content associated with the email message has been loaded into the rich media database 158, at step 522. By ensuring that the rich media is loaded in the rich media database 158 before the email message is delivered to the email data store 154, the email system 100 may efficiently deliver the rich media content upon the recipient opening the email message at a low cost.

If the rich media content associated with the URL is loaded in the rich media serve8 158, the technology delivers the email message to the email data store 154. However, if the rich media content is not loaded in the rich media database 158, at step 522, the rich media server 156 retrieves the rich media content from the sender's ad server 48 using the URL contained in the email message and loads the rich media content in the rich media database 158, at astep 524. The technology proceeds to deliver the email message to the email data store 154, at step 526.

Figure 6:
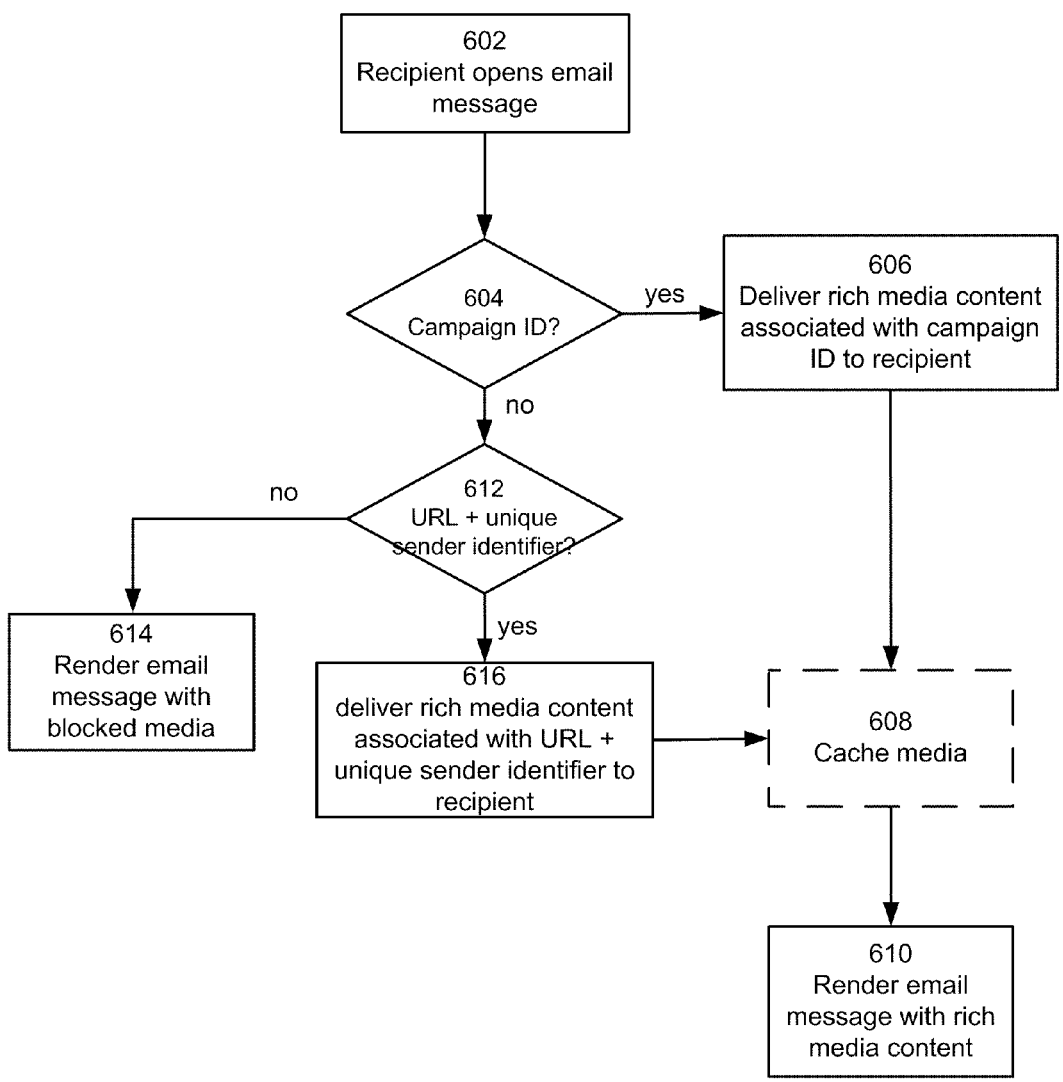
FIG. 6 depicts a flow diagram displaying exemplary steps for rendering an email message with associated rich media content.

FIG. 6 illustrates exemplary steps for rendering an email message with rich media content. At step 602, the technology identifies that the recipient has opened an email message. At step 604, the technology determines if the email message contains a campaign ID. If the email message contains a campaign ID, the technology delivers the rich media content stored in the rich media database 158 associated with the campaign ID to the recipient's computer (102a, 102b) via the media channel 180, at step 606. In one embodiment, the rich media content is retrieved from the rich media database 158 via a standard HTTP call from the client computer (102a, 102b). Other file transfer protocols known in the art may be used to retrieve the rich media content from the rich media database 158. At step 608, the recipient's computer caches the rich media content. FIG. 6 illustrates that step 608 is optional. At step 610, the technology renders the email message with the rich media content.

As discussed above, the email system 100 may deliver rich media content to a recipient based on a campaign ID or a combination of a URL and unique sender identifier contained in the email message opened by the recipient. Thus, if the email message does not contain a campaign ID, the technology determines if the email message contains a URL and unique sender identifier, at step 612. If the email message does not contain a URL and unique sender identifier, the technology displays the email message to the recipient, but blocks the display of any rich media content associated with the URL, at step 614. If the email message contains a URL and unique sender identifier, the technology delivers the rich media content from the rich media database 158, at step 616. The recipient's computer may cache the rich media content (step 608), and then renders the email message with the rich media content (step 610).

Figure 7:
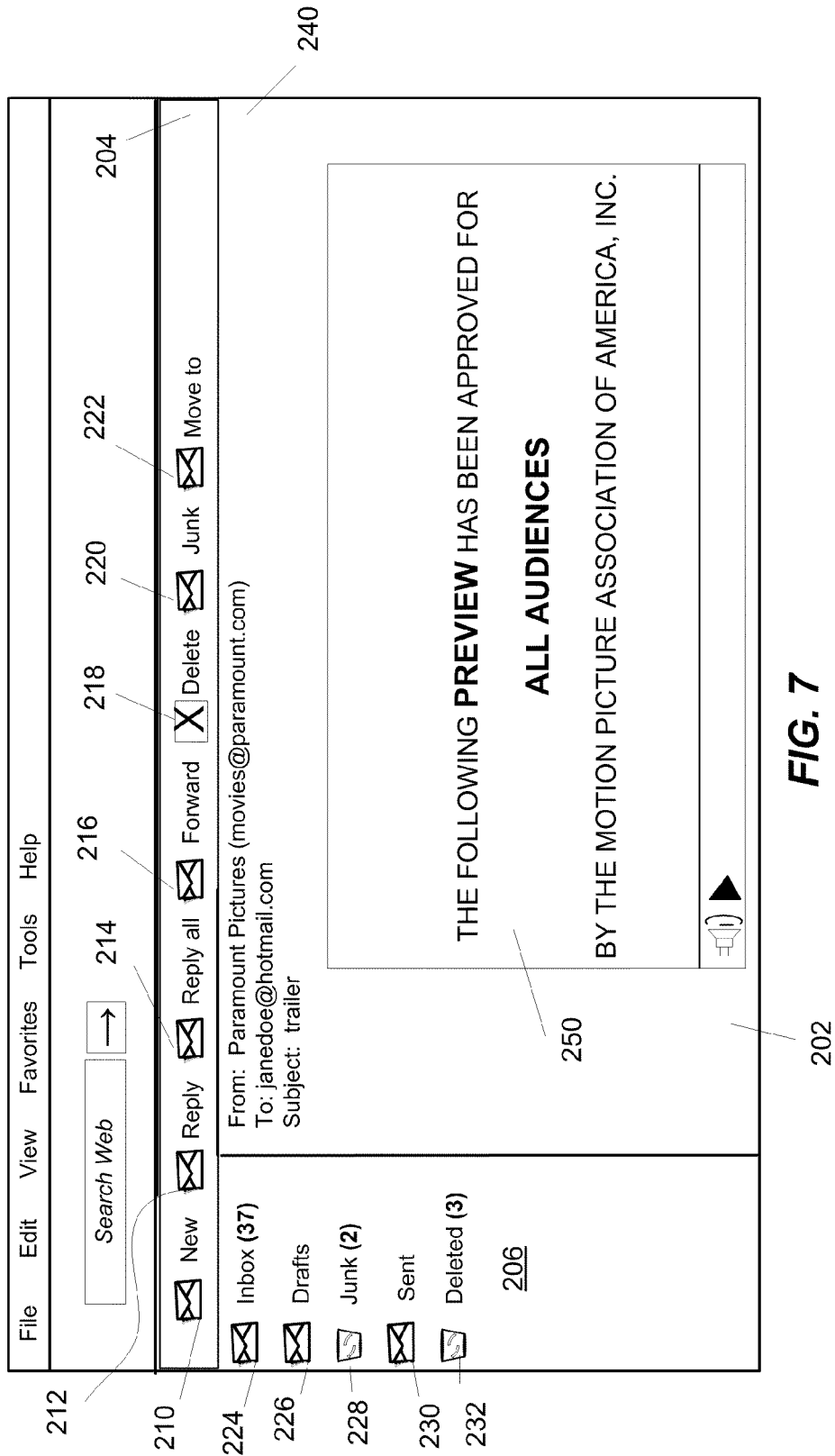
FIG. 7 depicts a user interface for displaying the rich media content within an email message.

FIGS. 7-8 illustrate two embodiments of rending an email with rich media content (step 610). FIG. 7 illustrates an exemplary mail user interface 200. The interface 200 includes a display window 202, toolbar 204 and a folder window 206. The display window 202 is currently displaying the content of an email opened by the user. The toolbar 204 includes several icons that a user can select to perform an action. By way of example only, the toolbar includes several buttons that a user can select, including a new message button 210, a reply button 212, a reply all button 214, a forward message button 216, a delete button 218, a junk button 220, a move to button 222, and an unsubscribe or remove me button (allowing the user to not receive email from a specific sender again). A toolbar is known in the art and therefore, does not require further disclosure herein. The folder window 206 displays an inbox folder 224, a drafts folder 226, a junk folder 228, a sent folder 230 and a deleted folder 232.

As shown in FIG. 7, the recipient's computer (102a, 102b) has rendered an email message from Paramount Pictures in the window 202. The rich media content 250, which in this instance is a movie trailer video, is displayed in the email message and may be viewed in the email message. The technology delivered the movie trailer to the recipient's computer via the media channel 180.

FIG. 8 illustrates rendering the rich media content associated with the email in a separate user interface. In this instance, the technology uses standard protocols to launch an application within the recipient's operating system. By way of example only, the rich media content may comprise a video file, such as a Windows Media Video (.wmv) file embedded in the email message. Upon the recipient selecting the rich media content, the technology launches a media player 280 (e.g., Microsoft's Media Player application) and displays the rich media content in the media player 280. Alternatively, the Windows Media Player application may launch upon the recipient opening the email message and display the movie trailer. Again, the technology delivered the movie trailer to the recipient's computer via the media channel 180.

The subject matter of the present technology is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. In addition, it is assumed that one skilled in the art is familiar with details pertaining to television signal detection, and so such details are omitted herein for purposes of clarity.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims.

We claim:

1. A method for providing rich media content to a user via an email system, comprising the steps of:

registering a sender of rich media content with the email system;

issuing a unique sender identifier to the sender;

receiving rich media content from the sender;

responsive to verifying the received rich media content is from the sender based on the issued unique sender identifier, the email system assigning a campaign ID to the rich media content, storing the received rich media content in a rich media database, and sending the campaign ID to the sender;

receiving an email message intended for delivery to the user;

determining whether the email message contains the campaign ID;

responsive to the email message containing the campaign ID,
the email system skipping checking of the email message for the unique sender identifier and delivering the email message to an email data store, and
responsive to receiving notification that the recipient has selected opening of the email message containing the campaign ID, delivering the email message from the email data store to a computer associated with the user and delivering the rich media content from the rich media database to the computer associated with the user via a dedicated media channel; and responsive to the email message not containing the campaign ID,
the email system checking the email message for the unique sender identifier and a Uniform Resource Locator (URL) for linking to media content for display to the user, responsive to the email message lacking the unique sender identifier, delivering the email message to the email data store, and responsive to receiving notification that the user has selected opening of the email message lacking the unique sender identifier, blocking delivery of the media content linked to the URL to the computer associated with the user.

2. The method as recited in claim 1, further including the step of:

displaying the rich media content in a body portion of the email message.

3. The method as recited in claim 1, further including the steps of:

launching a user interface by a recipient computer, and displaying the rich media content to the user in the user interface.

4. The method as recited in claim 1, further comprising the steps of:

responsive to the email message containing the unique sender identifier, determining whether the media content linked with the Uniform Resource Locator (URL) is stored in the rich media database and responsive to the media content linked with the URL not being stored in the rich media database, loading the media content linked with the URL into the rich media database;

delivering the email message to the email data store; and responsive to receiving notification that the user has selected opening of the email message containing the unique sender identifier and the URL, delivering the email message from the email data store to the computer associated with the user and delivering the rich media content from the rich media database to the computer associated with the user via a dedicated media channel.

5. One or more processor readable storage devices having processor readable code embodied on said processor readable storage devices, said processor readable code for programming one or more processors to preform a method comprising:

registering a sender of rich media content with the email system;

issuing a unique sender identifier to the sender;

receiving rich media content from the sender;

responsive to verifying the received rich media content is from the sender based on the issued unique sender identifier, the email system assigning a campaign ID to the rich media content, storing the received rich media content in a rich media database, and sending the campaign ID to the sender;

receiving an email message intended for delivery to a user;

determining whether the email message contains the campaign ID;

responsive to the email message containing the campaign ID, the email system skipping checking of the email message for the unique sender identifier and delivering the email message to an email data store, and responsive to receiving notification that the recipient has selected opening of the email message containing the campaign ID, delivering the email message from the email data store to a computer associated with the user and delivering the rich media content from the rich media database to the computer associated with the user via a dedicated media channel; and responsive to the email message not containing the campaign ID, the email system checking the email message for the unique sender identifier and a Uniform Resource Locator (URL) for linking to media content for display to the user, responsive to the email message lacking the unique sender identifier, delivering the email message to the email data store, and responsive to receiving notification that the user has selected opening of the email message lacking the unique sender identifier, blocking delivery of the media content linked to the URL to the computer associated with the user.

6. The one or more processor readable storage devices as recited in claim 5, further including the step of:

displaying the rich media content in a body portion of the electronic email message.

7. The one or more processor readable storage devices as recited in claim 5, further including the steps of:

launching a user interface by a recipient computer; and displaying the rich media content to the user in the user interface.

* * * * *